United States Patent [19]

Whittingham

[11] Patent Number: 4,635,904
[45] Date of Patent: Jan. 13, 1987

[54] VEHICLE JACK

[75] Inventor: Reginald P. Whittingham, Orange, Calif.

[73] Assignee: A & E Systems, Inc., Santa Ana, Calif.

[21] Appl. No.: 651,306

[22] Filed: Sep. 17, 1984

[51] Int. Cl.$^4$ .................................................. B60S 9/02
[52] U.S. Cl. ..................................... 254/425; 254/420; 192/56 R; 192/89 A
[58] Field of Search .................... 254/420, 423, 425; 192/56 R, 89 A

[56] References Cited

U.S. PATENT DOCUMENTS 3,817,493  6/1974  Hanser ................................ 254/423
4,067,543  1/1978  Orth et al. .......................... 254/425

Primary Examiner—Frederick R. Schmidt
Assistant Examiner—Judy J. Hartman
Attorney, Agent, or Firm—Charles H. Schwartz; Ellsworth R. Roston

[57] ABSTRACT

A leveling jack mounted on the frame of a vehicle with a horizontal stowed position and a vertical actuated position, including, a pair of telescoping tubular members, telescoping between open and closed position, a ball screw actuator including a ball member and a screw member supported within the tubular members and with one of the tubular members attached to the ball member for producing telescope movement of the one tubular member relative to the other tubular member in accordance with longitudinal movement of the ball member, a drive spindle coupled to the screw member for providing rotational movement of the screw member to produce longitudinal movement of the ball member, a motor and associated gear train coupled to the drive spindle and with the gear train providing a substantial reduction of speed of rotation of the drive spindle, an outer housing for mounting on the frame of the vehicle and with the tubular members, ballscrew actuator, drive spindle and motor and gear train forming a pivotable portion of the leveling jack all pivotable around a first pivot point within the outer housing between the horizontal and vertical positions, and a bracket pivotablly mounted to the outer housing at a second pivot point off center to the first pivot point and with the bracket actuated when the tubular members are telescoped to the closed position to provide rotation of the pivotable portion of the leveling jack from the vertical position to the horizontal position.

20 Claims, 10 Drawing Figures

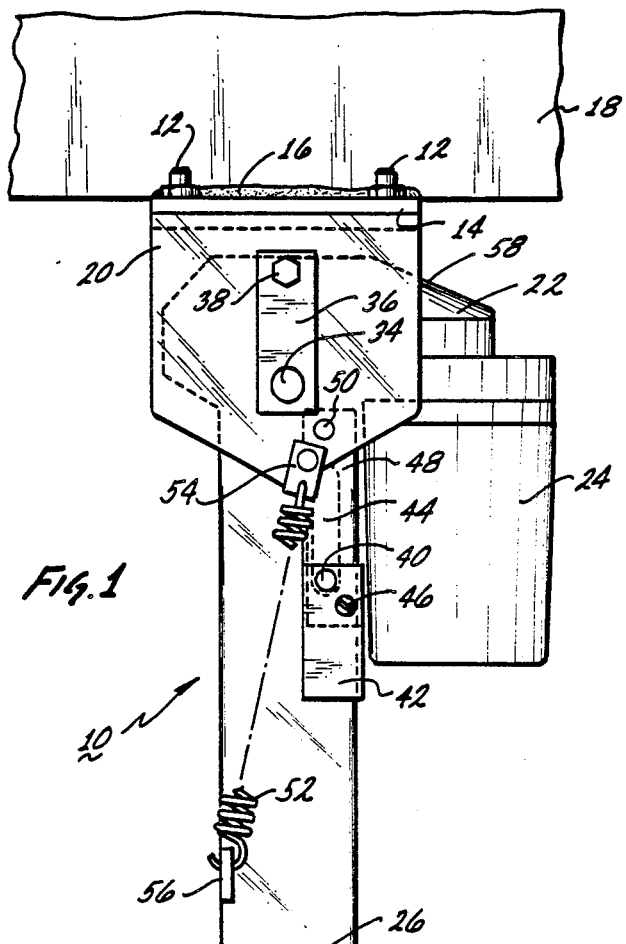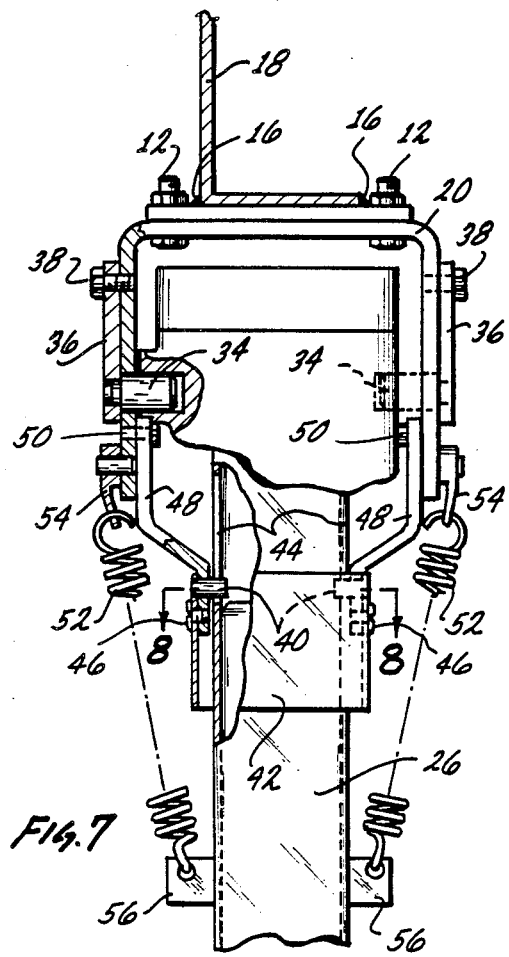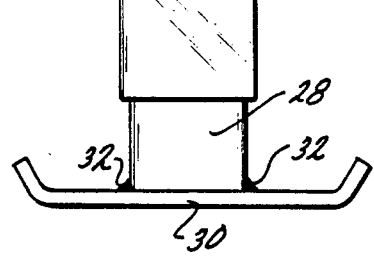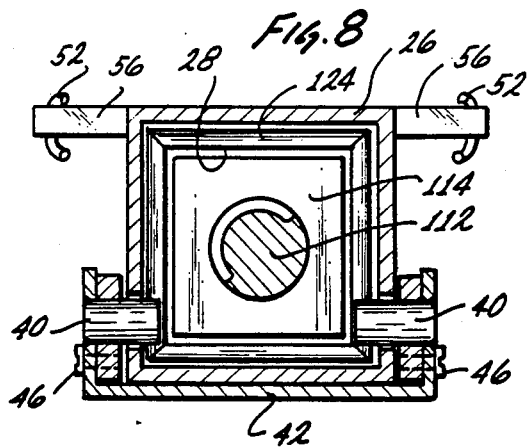

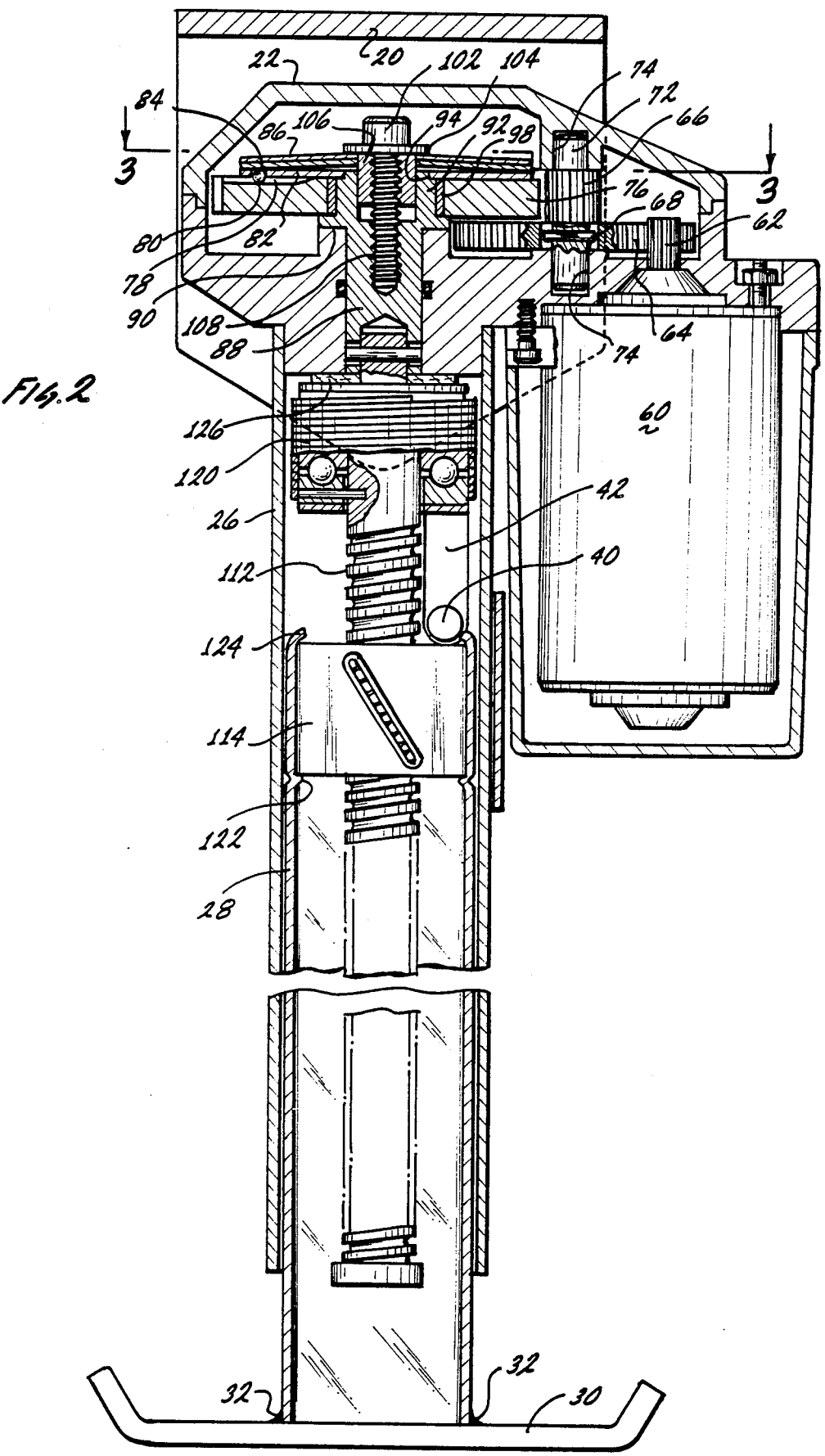

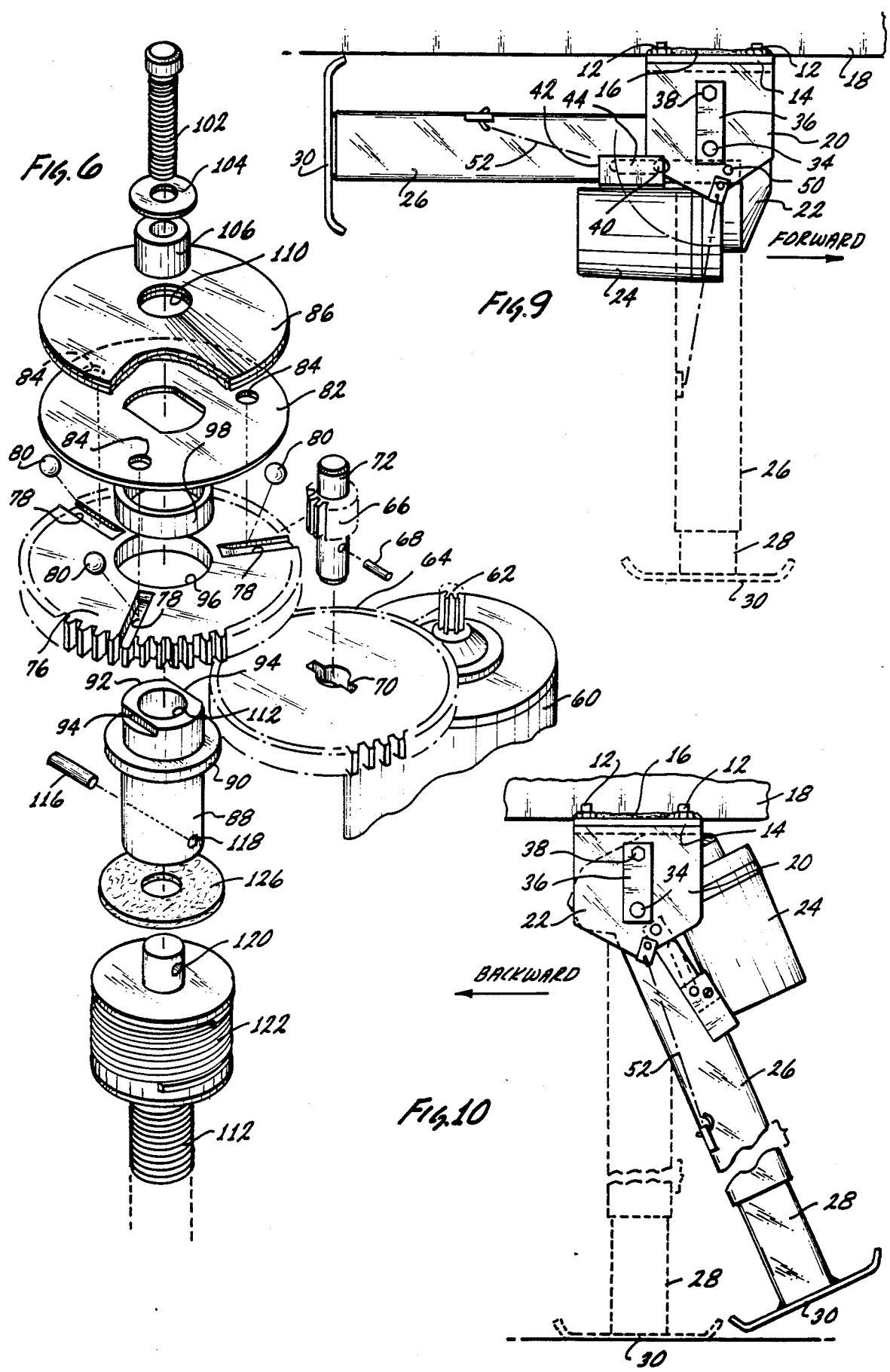

VEHICLE JACK

BACKGROUND OF THE INVENTION

1. Field of the Invention

The present invention is directed to a vehicle jack and specifically to a vehicle jack for leveling and stabilizing a recreational vehicle.

2. Description of the Prior Art

Recreational vehicles often include a plurality of vehicle jacks permenently affixed to four (4) frame positions for use in leveling and stabilizing the vehicle when parked. When the vehicle is parked, these jacks may be manually actuated so as to level and stabilize the vehicle. More preferably, the jacks may be electrically actuated so as to facilitate the operation of the jack to level and stabilize the vehicle.

Many of the prior art jacks, even though quite expensive, have deficiencies in design and operation. For example, these prior art jacks may be slow to operate and may not have a sufficient length of stroke so that the vehicle can be leveled for substantially all parking situations. Other deficiencies with the prior art jacks is that they may extend below the frame of the vehicle a considerable distance when mounted on the frame and therefore are subject to road damage. Additionally, with the prior art jacks, if the vehicle is driven off without retracting the jack this may either break or severely damage portions of the jack. Additionally, some of the prior art jacks do not provide sufficient lifting force so that they can be used on a wide variety of recreational vehicles.

Other problems with currently available jacks and levelers is that many of the prior art devices can suffer from water damage or contamination since interior portions of the prior art are not sealed. Others of the prior art devices include retraction arms which can bend in operation. In addition, other prior art devices include nylon gears which can strip due to poor alignment in the gearbox. In addition to the above, other problems are present with prior art devices so as to reduce their ability to properly perform their desired function.

SUMMARY OF THE INVENTION

The jack or leveler of the present invention is designed to provide a sufficient length of stroke and at a higher speed than prior art devices so as to accommodate a wide variety of levelling and stabilizing situations. Because the jack operates at a relatively high speed with a layer stroke, this eliminates the need to provide for an adjustable foot pad. In addition, the jack of the present invention is compact in design so as to project a minimum distance below the vehicle frame when the jack is not in use.

The jack of the present invention also provides for a large foot pad which is hard to bend and a strong pivot point so that in use the jack is not subject to twisting or bending. In addition, the jack of the present invention is designed so that if the operator forgets to retract the jack and drives off, the jack does not break but tilts back a sufficient distance to provide clearance. The jack of the present invention also maintains a relatively high lift capacity and a high capacity thrust and also includes an override clutch so that the gears cannot be stripped or the motor burn out when stalled. All of this is accomplished at a low or equal cost to other devices but yet with and improved performance and structure.

Other features of the jack of the present invention is a sealed design which prevents water damage or contamination to the jack motor and other mechanical components. In addition, the jack includes an adjustable clutch to allow for adjustments during manufacture to compensate for tolerances in the design of the mechanical gearing components. This significantly reduces the rejection rate when building the device and thereby tends to lower the cost of producing the jack of the present invention.

The leveling jack of the present invention is typically mounted on the frame of a vehicle to have a horizontal stowed position and a vertical actuated position. The jack includes a pair of telescoping tubular members which telescope between open and closed position. The telescoping is provided by a ball screw actuator including a ball member and a screw member supported within the tubular members and with one of the tubular members attached to the ball member for producing telescope movement of the one tubular member relative to the other tubular member in accordance with longitudinal movement of the ball member.

The jack of the present invention also includes a drive spindle coupled to the screw member for providing rotational movement of the screw member to produce longitudinal movement of the ball member. A motor and associated gear train is coupled to the drive spindle and with the gear train providing a substantial reduction of the speed of rotation of the drive spindle. A clutch mechanism is coupled between the gear train and the drive spindle for providing slippage between the gear train and the drive spindle when the force on the telescoping members exceeds a predetermined amount.

The jack includes an outer housing for mounting on the frame of the vehicle and with the tubular members, ballscrew actuator, drive spindle and motor and gear train forming a pivotable portion of the leveling jack all pivotable around a first pivot point within the outer housing between the horizontal and vertical positions. A bracket is pivotablly mounted to the outer housing at a second pivot point off center to the first pivot point and with the bracket actuated when the tubular members are telescoped to the closed position to provide rotation of the pivotable portion of the leveling jack from the vertical position to the horizontal position.

BRIEF DESCRIPTION OF THE DRAWINGS

A clearer understanding of the present invention will be had with reference to the following description and drawings wherein:

FIG. 1 is a side view of the exterior of the jack of the present invention as mounted to the frame of the vehicle;

FIG. 2 is a cross sectional view of the jack of FIG. 1;

FIG. 6 is an exploded view of the motor gearing and clutch arrangement;

FIG. 7 is a front view partially broken away showing the over center pivoting of the jack;

FIG. 8 is a cross sectional view taken along lines 8—8 of FIG. 7;

FIG. 9 is a side view showing the jack both in the stowed and in the actuated positions, and FIG. 10 is a side view of the jack illustrating the pivoting of the jack backward if the vehicle is driven off before retracting the jack.

DESCRIPTION OF THE PREFERRED EMBODIMENT

Figure 3:
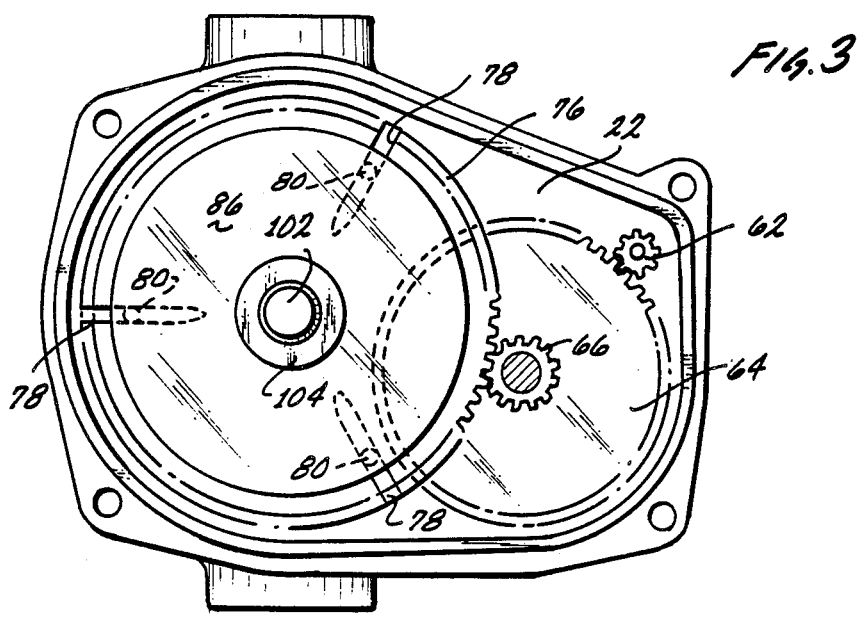
FIG. 3 is a cross sectional view taken along the lines 3—3 of FIG. 2.
Figure 4:
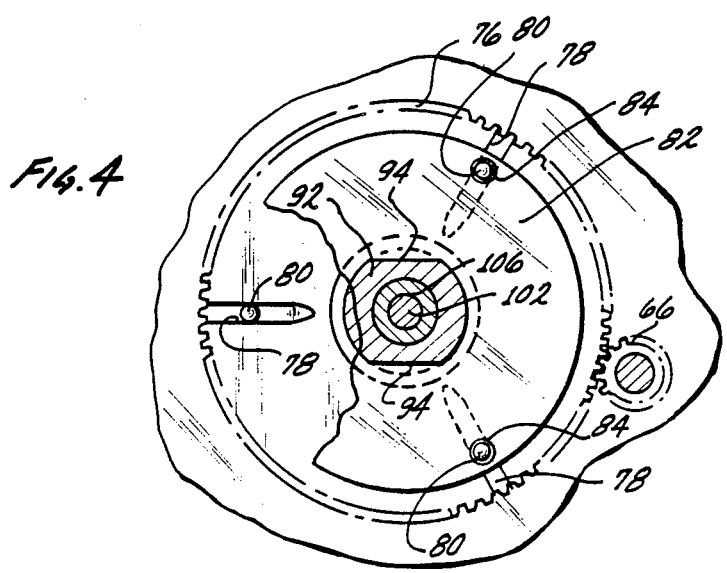
FIG. 4 is a fragmentary view similar to that of FIG. 3 but with the spring plates partially cut away.

As shown in FIG. 1, a leveling jack 10 constructed in accordance with the teachings of the present invention is attached with bolts 12 to a mounting plate 14. The mounting plate 14 may in turn be welded as shown at positions 16 to a frame 18 of the vehicle.

The jack 10 includes an upper housing 20 formed with a U-shaped configuration as shown in FIG. 7. The housing 20 receives and supports gear housing 22 and motor housing 24. Extending down from the gear housing 22 are a pair of square sectioned telescoping tubular members 26 and 28. The tubular member 26 is a affixed at its upper end to the gear housing 22 as shown in FIG. 2, and the tubular member 28 is slidably disposed within the tubular member 26. A foot pad 30 is welded at positions 32 to the bottom of the tubular member 28.

The gear housing 22, motor housing 24 and tubular members 26 and 28 and foot pad 30 are all pivoted within the upper housing 20 around the pivot points formed by pivot pins 34. The pivot pins 34 are retained in position by plates 36 which plates are held in place by bolts 38. As shown in FIG. 9 and 10, the entire jack assembly can rotate to a stowed position where the tubular member 26 is parallel to the frame 18, or to an actuated position shown in dotted line in FIG. 9 where the tubular members are perpendicular to the frame 18. As shown in FIG. 10, the jack structure may even rotate a particular angular degree if the vehicle is driven in the wrong direction off the jack. This prevents the jack from breaking.

Pins 40 supported by a C-shaped cover 42 extend into slots 44 in the tubular member 26. The C-shaped cover is attached with screws 46 to a pair of pivotable arms 48. The arms 48 are pivotably mounted to the housing 20 using pivot pins 50.

Spring members 52 extend between the outer housing 20 and the tubular member 26 and specifically are attached to attachment points 54 on the housing 20 and 56 on the tubular member 26.

The external operation of the jack of the present invention is as follows. As shown in FIG. 9 the jack is normally stowed in the horizontal position shown in full line and with the tubular member 26 lying parallel to the frame of the vehicle 18. In this position, the C-shaped cover 42 encloses the slot 44 to thereby protect the interior from water and road contamination. The springs 52 have been stretched and would normally tend to pull the tubular member 26 downward. However, the pins 40 internally engage a portion of the jack structure and provide a force to maintain the jack horizontal.

When the jack is actuated and the pins 40 are moved internally out of engagement, the normal pull of gravity on the tubular members 26 and 28 plus the pull of the springs 52 rapidly rotate the jack downward to the vertical position shown in dotted line in FIG. 9. Further internal actuation provides for the tubular member 28 telescoping outward to engage the ground to stabilize and level the vehicle.

When the jack is retracted, the tubular member 28 is telescoped within the tubular member 26 and when the tubular member 28 is fully within the tubular member 26, the off center arrangement between the two pivot points formed by the pivot pins 34 and 50 together with the pins 40 sliding in the slots 44 provide for the jack to rotate upward to the full line position shown in FIG. 9.

With the jack in the extended position the operator of the vehicle may forget and drive off. The jack is normally mounted so that if the vehicle is driven forward the jack pivot back to the full line position as shown in FIG. 9. If however, the vehicle is driven backward, most prior art jacks would break. The present invention allows some limited angular rotation of the jack as shown in FIG. 10 to prevent such breakage. This limited angular rotation, as shown in FIG. 10, is accomplished by shaping the gear housing 22 to have a sloping surface 58 to allow this limited rotation. For example, the rotation may be approximately thirty degrees (30°) from the vertical which angular rotation is sufficient to prevent breakage of the jack.

The interior construction for the jack of the present invention may be seen with reference to FIGS. 2 through 6 and 8. Specifically, a motor 60 is enclosed by the motor housing 24. The motor may be electrically actuated and the specific details of the construction of the motor do not form a part of the present invention. Extending from the motor is a rotating shaft formed as a gear pinion 62. The motor may rotate at a relatively high speed and with the speed of rotation of the motor significantly reduced by a gear train which reduction in speed provides a multiplication in force produced by the jack so as to ensure a sufficient lift for the jack.

The pinion 62 is coupled to a first gear 64 which gear 64 is relatively large and has a large number of teeth so as to substantially reduce the speed of rotation of the gear 64 relative to the pinion 62. The gear 64 includes a pinion 66 mounted through the center of the gear 64 and rotating along with the gear 64, A pin 68 passes through the shaft of the pinion 66 and is positioned within a slot 70 in the gear 64 so as to lock the gear 64 and pinion 66 together. The pinion 66 and gear 64 are held for rotation within the gear housing 22 in accordance with a shaft member 72 extending from the pinion 66 and fitting within recesses 74 in the gear housing 22.

The pinion 66 engages a clutch drive gear 76 having a large number of teeth on its periphery so that the speed of rotation of the gear 76 is further greatly reduced in accordance with the gear ratio between the number of teeth on the gear 76 and the number of teeth on the gear 66. It can be seen therefore, that the speed of the rotation of the motor 60 is twice reduced so that the speed of rotation of the gear 76 is small fraction of the speed of rotation of the motor 60. The upper surface of the clutch drive gear 76 also forms a part of a clutch mechanism and specifically, the upper surface includes three (3) slots 78 each of which is designed to receive a ball member 80.

A clutch plate 82 overlays the gear 76 and the balls 80 and with the clutch plate 82 including three (3) openings 84 corresponding in size to the balls 80 and in position to the slots 78. Further overlaying the clutch plate 82 are a pair of clutch springs 86.

A drive spindle 88 receives and supports the clutch drive gear 76 and the remaining portions of the clutch assembly. The drive spindle 88 includes a flange portion 90 and an upper support section 92 having flattened stepped side portions 94. The clutch drive gear 76 includes a central opening 96 which receives a cylindrical bearing member 98. The gear 76 and bearing member 98 are received and supported by flange portion 90. The gear 76 and bearing member 98 would rotate freely around the drive spindle 88 except for the remaining portions of the clutch assembly.

The clutch plate 82 includes an opening 100 having flattened side portions conforming to the flattened side portions 94 of the upper portion 92 of the drive spindle 88. The clutch plate 82 is therefore locked onto the drive spindle 88 and any rotation of the clutch plate 82 provides for rotation of the spindle 88. When the clutch plate 82 is positioned against the upper surface of the drive gear 76, the three (3) balls 80, when positioned in the slots 78 and located within the openings 84 of the plate 82, lock the clutch plate 82 to the clutch drive gear 76. Any rotation of the clutch drive gear 76 thereby provides for rotation of the spindle 88.

The clutch springs 86 are locked in position using a bolt member 102, a washer 104 and a nut member 106. The bolt 102 is passed through the washer and is then threaded completely through the nut 106. The front end of the bolt 102 is then threaded into a threaded opening 108 in the drive spindle 88. The clutch springs 86 include openings 110 complementary to the outside diameter of the nut 106. In addition, the upper end of the spindle 88 includes an opening 112 again complementary to the outside diameter of the nut 106. The nut 106 therefore not only retains the washer 104 in position against the head of the bolt 102 but also retains the clutch springs 86 in the proper position and retains the entire clutch assembly properly oriented at the upper end portion 92 of the drive spindle 88.

Figure 5:
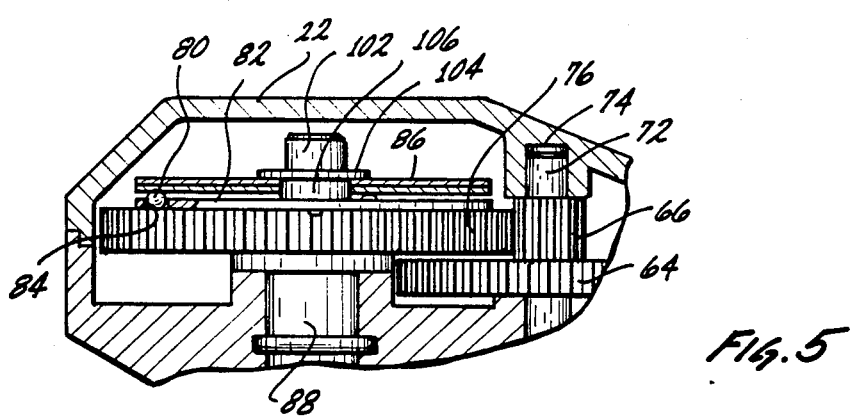
FIG. 5 is an enlarged fragmentary view of the top of the jack showing the spring plates in a sprung position.

The bolt 102 may be tightened or loosened so as to vary the force at which the clutch will slip. This is shown in FIG. 5 where the clutch springs 86 have been overridden to thereby prevent rotation of the drive spindle 88. Specifically, if an overload occurs on the drive spindle 88, the overload force is transmitted through the clutch plate 82 to rotate the plate 82 relative to the clutch drive gear 87 and thereby disengage the balls 80 out of the slots 78 and onto the upper surface of the clutch drive gear 76. In order to provide this disengagement, the clutch springs 86 must be forced upward into to a flat configuration as shown in FIG. 5. Therefore, the force of the clutch springs 86 controls the force at which the clutch operates to provide slippage.

By tightening or loosening the bolt 102, the force to which the jack operates before the clutch slips and provides for protection against damage to the jack may be easily controlled. In the prior art, such adjustments are not provided during the manufacture of the jack thereby producing a high number of rejections during the manufacture of the jack. In the jack of the present invention, the force at which the clutch operates may be easily adjusted to thereby greatly reduce the number of rejected assemblies during manufacture. In addition, during any servicing of the jack of the present invention, the proper force for the operation of the jack may be tested and adjusted to the factory standard.

Attached at the lower end of the drive spindle is a ball screw actuator assembly including a screw member 112 and a ball follower 114. The upper end of the screw member 112 is pinned to the bottom of the drive spindle 88 through the use of the pin member 116 passing through complementary openings 118 and 120 in the spindle 88 and the upper end of the screw 112. Additionally, positioned around the upper end of the screw 112 is a brake assembly 122. The brake assembly is of a known type providing one way braking to prevent any back drive. The back drive may be caused by the force on the jack at the foot pad due to the weight of the vehicle. The brake 122 thereby prevents retraction of the brake when in an actuated position unless the retraction occurs by the operation of the motor to drive the spindle in the direction to provide retraction. A thrust bearing 126 is located between the top of the brake 122 and the bottom of the housing 22.

The ball follower 114 is captured at the upper end of the square tubular member 28 between a shelf, formed by a crimp 122, and the upper folded over end 124. When the screw member 112 is rotated, the ball screw follower 114 follows and this in turn provides for telescoping of the inner tube 28 within the outer tube 26. The upper end of the tubular member 28, when retracted to the position shown in FIG. 2, engages the inner end of the pins 40. This engagement of the inner end of the pins 40 provides for the rotation of the jack from the vertical to the horizontal position shown in FIG. 9.

As the pins 40 engage the top surface 124 of the inner tube 128, as shown in FIG. 8, this tends to push the pins 40 upward in the slots 44. However, because the pins 40 are held at the end of the arms 48 and the arms 48 are pivotably mounted on the upper housing 20, this tends to produce rotation of the jack assembly since the jack assembly and specifically the gear housing 22 is also pivotably mounted to the upper housing 20 by the pins 34. This provides for two pivot points, off center to each other, to produce the desired rotation from the vertical to the horizontal positions as shown in FIG. 9.

Specifically, when the upper end of the tubular member 114 engages the inner end of the pins 40, this is translated into a rotational force of the arms 48 around the pivot pins 50 as the pins 40 are moved upward in the slots 44. This forces the entire jack structure to rotate upward around the pivot point formed by the pins 36.

The present invention thereby provides for a leveling jack for leveling and stabilizing a vehicle, and wherein normally four (4) such jacks are located at the outer extremities on the frame of the vehicle, and with the jacks permanently mounted to normally lie horizontal when not in operation and with the jacks being deployed from a horizontal to a vertical position to produce leveling and stabilizing of the vehicle.

The jack of the present invention includes a ball screw actuator located within two telescoping tubes to provide for very smooth and substantially frictionless movement between the telescoping tubes. A one way brake eliminates any back drive after the jack has been deployed in operation. The jacks are operated by a motor drive through a gear train to substantially reduce the speed of rotation of the motor from a relatively high speed to a very low speed and to increase the force of the telescoping members. The gear train includes a spring clutch so that the gear train will slip if the jack is overloaded to thereby prevent damage to the jack. The spring clutch has a built in built in adjustment so that the overload force may be quickly and accurately set during manufacture of the jack or during servicing of the jack to thereby substantially reduce the rejection rate during manufacture and servicing of the jack.

The jack also includes a built in bracket to cover over a slot so that when the jack is in the stowed position the bracket slides up and covers the slot so as to prevent contamination from moisture or road grime. The gear housing for the jack is also designed to have a sloping back face so that if the vehicle is inadvertently driven off without retracting the jack, the jack has a rotational clearance to prevent breaking of the jack.

Although the invention has been described with reference to a particular embodiment, various adaptations and modifications may be made and the invention is only to be limited by the appended claims.

I claim:

1. A leveling jack for mounting on a vehicle having a frame to have a stowed position with the jack lying substantially horizontal to the frame and having an actuated position with the jack extending vertical to the frame, including,
   a pair of telescoping tubular members telescoping between open and closed position,
   a ball screw actuator including a ball member and a screw member supported within the tubular members and with one of the tubular members attached to the ball member for producing telecopic movement of one tubular member relative to the other tubular member in accordance with longitudinal movement of the ball member relative to the screw member,
   a drive spindle coupled to the screw member for providing rotational movement of the screw member to produce longitudinal movement of the ball member,
   a motor for rotation at a particular speed and associated gear train coupled to the drive spindle and with the gear train providing a substantial reduction of speed of rotation of the drive spindle relative to the speed of rotation of the motor,
   an outer housing for mounting on the frame of the vehicle and with the tubular members, ball screw actuator, drive spindle and motor and gear train forming a pivotable portion of the leveling jack pivotable around a first pivot point within the outer housing between the horzontal and vertical positions, and
   an arm interconnecting the outer housing and the pivotable portion of the leveling jack and pivotally mounted to the outer housing at a second pivot point off center of the first pivot point and mounted in sliding engagement with the Pivotable portion by a pin and guide slot arrangement to slide relative to the pivotable portion when the tubular members are telescoped to the closed position to provide rotation of the arm around the second pivot point to in turn provide rotation of the pivotable portion of the leveling jack around the first pivot point to guide the pivotable portion of the leveling jack from the vertical position to the horizontal position.

2. The leveling jack of claim 1 additionally including at least one spring member extending between the outer housing and the other tubular member to provide a pulling force to pull the pivotable portion of the leveling jack from the vertical position to the horizontal position and to maintain the pivotable portion in the horizontal position.

3. The leveling jack of claim 1 wherein the arm includes at least one pin and the other tubular member includes at least one slot and with the pin sliding in the slot to guide the pivotable portion of the leveling jack between the horizontal and vertical positions.

4. The leveling jack of claim 3 wherein the arm additionally includes a cover portion extending from the arm and spaced from the slot and with the cover portion having a length sufficient to cover the slot when the jack is in the horizontal position.

5. The leveling jack of claim 1 additionally including a one way brake coupled between the drive spindle and the screw member to provide braking of the drive spindle only in the direction of rotation of the screw member which direction provides telescoping of the tubular members to the closed position.

6. The leveling jack of claim 1 additionally including a clutch mechanism means coupled between the gear train and the drive spindle for providing slippage between the gear train and drive spindle when the force on the telescoping members exceeds a predetermined amount.

7. The leveling jack of claim 6 wherein the clutch mechanism includes
   a plate locked to the drive spindle and with the plate including at least one opening,
   a portion of the gear train also including an opening complementary to the opening in the plate, and
   at least one ball member positioned in the openings in the plate and the portion of the gear train for intercoupling the drive spindle to the gear train.

8. The leveling jack of claim 7 wherein the opening in the portion of the gear train is formed as a slot on a top surface of a final gear in the gear train and with the final gear positioned around the drive spindle.

9. The leveling jack of claim 8 additionally including a disc spring overlapping the plate to spring load the ball and control the predetermined amount of force.

10. The leveling jack of claim 9 additionally including an adjustment screw coupled to the disc spring for varying the spring load to control the predetermined amount of force.

11. A leveling jack for mounting on a vehicle having a frame to have a stowed position with the jack lying substantially horizontal to the frame and having an actuated position with the jack extending vertical to the frame, including,
    a pair of telescoping tubular members telescoping between open and closed position,
    an actuator for translating rotational movement to longitudinal movement supported within the tubular members and with one of the tubular members attached to a first portion of the actuator for producing telecopic movement one tubular member relative to the other tubular member,
    a drive spindle coupled to a second portion of the actuator for providing rotational movement of the second portion to produce longitudinal movement of the first portion,
    a motor and associated gear train coupled to the drive spindle and with the gear train providing a substantial reduction of speed of rotation of the drive spindle relative fo the speed of rotation of the motor,
    an outer housing for mounting on the frame of the vehicle and with the tubular members, ball screw actuator, drive spindle and motor and gear train forming a pivotable portion of the leveling jack pivotable around a first pivot point within the outer housing between the horizontal and vertical positions,
    a clutch mechanism means coupled between the gear train and the drive spindle for providing slippage between the gear train and drive spindle when the force on the telescoping members exceeds a predtermined amount, and an arm interconnecting the outer housing and the pivotable portion of the leveling jack and pivotally mounted to the outer housing at a second pivot point off center to the first pivot point and mounted in sliding engagement with the pivotable portion by a pin and guide slot arrangement to slide relative to the pivotable portion when the tubular members are telescoped to the closed position to provide rotation of the arm around the second pivot point to in turn provide rotation of the pivotable portion of the leveling jack around the first pivot point guide the pivotable portion of the leveling jack from the vertical position to the horizontal position.

12. The leveling jack of claim 11 wherein the clutch mechanism includes
   a plate locked to the drive spindle and with the plate including at least one opening,
   a portion of the gear train also including an opening complementary to the opening in the plate, and
   at least one ball member positioned in the openings in the plate and the portion of the gear train for intercoupling the drive spindle to the gear train.

13. The leveling jack of claim 12 wherein the opening in the portion of the gear train is formed as a slot on a top surface of a final gear in the gear train and with the final gear positioned around the drive spindle.

14. The leveling jack of claim 13 additionally including a disc spring overlapping the plate to spring load the ball and control the predetermined amount of force.

15. The leveling jack of claim 14 additionally including an adjustment screw coupled to the disc spring for varying the spring load to control the predetermined amount of force.

16. The leveling jack of claim 11 additionally including at least one spring member extending between the outer housing and the other tubular member to provide a pulling force to pull the pivotable portion of the leveling jack from the vertical position to the horizontal position and to maintain the pivotable portion in the horizontal position.

17. The leveling jack of claim 11 wherein the arm includes at least one pin and the other tubular member includes at least one slot and with the pin sliding in the slot to guide the pivotable portion of the leveling jack between the horizontal and vertical positions.

18. The leveling jack of claim 17 wherein the arm additionally includes a cover portion extending from the arm and spaced from the slot and with the cover portion having a length sufficient to cover the slot when the jack is in the horizontal position.

19. The leveling jack of claim 11 additionally including a one way brake coupled between the drive spindle and the second portion of the actuator to provide braking of the drive spindle only in the direction of rotation of the second portion which direction provides telescoping of the tubular members to the closed position.

20. The leveling jack of claim 11 wherein the actuator is formed as a ball screw actuator and with the first portion formed as a ball member and the second portion formed as a screw member.

* * * * *